US008914486B2

(12) United States Patent
Zhao et al.

(10) Patent No.: US 8,914,486 B2
(45) Date of Patent: Dec. 16, 2014

(54) METHOD, SYSTEM AND DEVICE FOR IMPLEMENTING IDENTITY IDENTIFIER AND LOCATION SEPARATION

(75) Inventors: Ningxia Zhao, Shenzhen (CN); Zhimeng Teng, Shenzhen (CN); Bo Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 374 days.

(21) Appl. No.: 13/257,909

(22) PCT Filed: Nov. 5, 2009

(86) PCT No.: PCT/CN2009/074816
§ 371 (c)(1),
(2), (4) Date: Oct. 9, 2011

(87) PCT Pub. No.: WO2010/118604
PCT Pub. Date: Oct. 21, 2010

(65) Prior Publication Data
US 2012/0040690 A1    Feb. 16, 2012

(30) Foreign Application Priority Data

Apr. 15, 2009  (CN) .......................... 2009 1 0134446

(51) Int. Cl.
*H04W 36/00*   (2009.01)
*G06F 15/173*  (2006.01)
*H04L 29/12*   (2006.01)
*H04W 60/00*   (2009.01)
*H04W 80/04*   (2009.01)
*H04W 8/26*    (2009.01)

(52) U.S. Cl.
CPC ...... *H04L 29/12311* (2013.01); *H04L 61/2084* (2013.01); *H04W 60/005* (2013.01); *H04W 80/04* (2013.01); *H04W 8/26* (2013.01)
USPC ........................... 709/223; 709/226; 455/436

(58) Field of Classification Search
USPC .......................................................... 709/222
See application file for complete search history.

(56) References Cited

U.S. PATENT DOCUMENTS 8,078,172 B2 * 12/2011 Aaron ........................... 455/436
2009/0061877 A1 *  3/2009 Gallagher et al. ............ 455/436

FOREIGN PATENT DOCUMENTS

CN    1801764 A    7/2006
CN    1953413 A    4/2007
WO    0211407 A2   2/2002

OTHER PUBLICATIONS

International Search Report on international application No. PCT/CN2009/074816, mailed on Feb. 11, 2010.

(Continued)

*Primary Examiner* — Glenton B Burgess
*Assistant Examiner* — Angela Nguyen
(74) *Attorney, Agent, or Firm* — Oppedahl Patent Law Firm LLC

(57) ABSTRACT

The present invention discloses a method, system and device for implementing identity identifier and location separation, to solve the technical problem that the change of the host IP address results in the connection interrupt of the terminal in the process of moving. By separating and mapping the identity identifier and location identifier, the present invention eliminates the network limitation because of the IP addresses with dual functions of the identity identifier and location identifier; the terminal host identity identifier and the terminal location identifier are mapped, the IP address is used for route only, and the host identity is denoted by the host identifier. Consequently, when the host address is changed because of moving or multi-homing and so on, the route is changed, the host identifier still keeps unchanged, and the network application and connection are not interrupted. Therefore, the continuity of the session can be implemented, the mobility, the multi-homing, the dynamic reallocation of IP addresses, and the inter-access among the different network area can be implemented effectively.

7 Claims, 6 Drawing Sheets

(56) References Cited

OTHER PUBLICATIONS

English Translation of the Written Opinion of the International Search Authority in international application No. PCT/CN2009/074816, mailed on Feb. 11, 2010.
Supplementary European Search Report in European application No. 09843238.8, mailed on Jun. 23, 2014.
International Telecommunication Union, Series Y: Global Information Infrastructure, Internet Protocol Aspects and Next-Generation Networks, Next Generation Networks—Frameworks and functional architecture models, General requirements for ID/locator separation in NGN, Jan. 23, 2009.
Min-Kyo In et al., Electronics and Telecommunications Research Institute, Splitting mechanism for IP into Identifier and Locator in NGN, Feb. 1, 2007.
Ved P. Kafle et al., National Institute of Tinformation and Communications Technology (NICT), Tokyo, Japan, Generic identifiers for ID/locator split internetworking, May 12, 2008.

* cited by examiner

METHOD, SYSTEM AND DEVICE FOR IMPLEMENTING IDENTITY IDENTIFIER AND LOCATION SEPARATION

TECHNICAL FIELD

The present invention relates to the technical field of computer networks and mobile communication as well as computer networks, and more particularly to a method, system and device for implementing identity identifier and location separation.

BACKGROUND

In the present, protocol entities of various layers except for the physical layer have name spaces in the structures of layers of the Internet, which are respectively Media Access Control (called MAC for short) addresses of the link layer, IP addresses of the network layer, IP addresses and port numbers of the transport layer, and domain names of the application layer. Wherein the MAC addresses are required to be unique in the sub-network, and the port numbers are required to be unique in the host, consequently, the IP addresses and the domain names are the global name space in the Internet, and the parsing between the domain names and the IP addresses is implemented by a Domain Name Server (called DNS for short).

In the current structure of the name space, the IP addresses have dual functions, one of which is the location identifier of the terminal host network interface of the network layer in the network topology, and the other of which is the identity identifier of the host network interface of the transport layer. And, because the moving of the host is not considered in the early design of the TCP/IP, the IP addresses have dual functions of the identity identifier and location identifier in the traditional network.

FIG. 1 is an architecture diagram of a Next Generation Network (called NGN for short) in pertinent prior art. The existing NGN primarily comprises a network access control component, a resource control component, a transport component, a service control component, and a user terminal/user network component, as shown in FIG. 1. Wherein the network access control component provides functions such as registration, authentication and authority, address allocation, parameter configuration, location management for the user terminal/user network which accesses the NGN, such as the Network Attachment Control Function (called NACF for short) and the Transport User Profile (called TUP for short) in the NGN. The resource control component implements functions such as admission control and resource reservation based on the policy and the state of the network resources when the user terminal/user network accesses the network, such as the Resource and Admission Control Function (called RACF for short) in the NGN. The transport component implements functions of information transmission, such as the Transport Function shown in FIG. 1. The service control component belongs to a part of the service layer and implements functions such as registration, authentication and authority, resource control on the service layer, such as the Service Control Function (called SCF for short) and the Service User Profile (called SUP for short) in the NGN. And the user terminal/user network component provides the network access function for the user, such as the Customer Premises Equipment (called CPE for short)/User Equipment (called UE for short) in the NGN.

With the development of the NGN, the mobility of the user and the multi-homing of the host are more and more popular, thus making the drawback related to the semantic overload of the IP addresses become apparent. In the present, when the host IP address is changed, the route is changed, and the identity identifier of the terminal host is changed as well. The change of the route will not result in a problem which occurs in the network. However, the change of the host identity identifier will result in the interruption of the application and connection.

SUMMARY

In view of the above problem, a method, system and device for implementing identity identifier and location separation is provided in the present invention, which solves the technical problem that the change of the host IP address results in a connection interruption of the terminal in the process of moving due to the IP addresses with dual functions of identity identifier and location identifier in the prior art.

According to one aspect of the present invention, a method for implementing identity identifier and location separation is provided.

The method for implementing identity identifier and location separation according to the present invention comprises: an ID-loc-split Control Functions entity sends a mapping response to an ID-loc-split Mapping Functions entity after receiving a location change request, wherein the mapping response contains a location where a terminal host is currently located and an identity identifier; the ID-loc-split Mapping Functions entity updates a mapping relationship between the terminal host identity identifier and the terminal host location according to the mapping response; and the ID-loc-split Control Functions entity selects an address corresponding to the location where the terminal host is currently located from the updated mapping relationship between the terminal host identity identifier and the terminal host location.

According to another aspect of the present invention, a system for implementing identity identifier and location separation is provided.

The system for implementing identity identifier and location separation according to the present invention comprises: a resource control component, a network access control component, an ID-loc-split Mapping Functions entity, and an ID-loc-split Control Functions entity. Wherein the resource control component is arranged to send a location change request; the network access control component is arranged to receive the location change request, and send a mapping request to the ID-loc-split Mapping Functions entity; the ID-loc-split Mapping Functions entity is arranged to receive the mapping request, send a location update request to the ID-loc-split Control Functions entity, and update a mapping relationship between a terminal host identity identifier and a terminal host location according to a mapping response returned from the ID-loc-split Control Functions entity, wherein the mapping response contains the location where a terminal host is currently located and the identity identifier; and the ID-loc-split Control Functions entity is arranged to receive the location update request, return the mapping response message, and select an address corresponding to the location where the terminal host is currently located from the updated mapping relationship between the terminal host identity identifier and the terminal host location.

According to yet another aspect of the present invention, a device for implementing identity identifier and location separation is provided.

The device for implementing identity identifier and location separation according to the present invention comprises: an ID-loc-split Mapping Functions entity and an ID-loc-split Control Functions entity. Wherein the ID-loc-split Mapping Functions entity is arranged to store a mapping relationship between a terminal host identity identifier and a terminal host location, and send a location update request to the ID-loc-split Control Functions entity after receiving a mapping request sent from a network access control component, and update the mapping relationship between the terminal host identity identifier and the terminal host location according to a mapping response sent from the ID-loc-split Control Functions entity, wherein the mapping response contains the location where the terminal host is currently located and the identity identifier; and the ID-loc-split Control Functions entity is arranged to receive the location update request, return the mapping response message, select an address corresponding to the location where the terminal host is currently located from the mapping relationship between the terminal host identity identifier and the terminal host location, and return the selected address to the network access control component via the ID-loc-split Mapping Functions entity.

According to at least one solution described above in the present invention, the network limitation in the traditional network because of the IP addresses with dual functions of the identity identifier and location identifier is eliminated by separating and mapping the identity identifier and location identifier. By mapping the terminal host identity identifier and the terminal location identifier, the IP address is used for route only, and the host identity is denoted by the host identifier. Consequently, when the host address is changed because of moving or multi-homing and so on, the route is changed, the host identifier still keeps unchanged, thus the network application and connection are not interrupted. Therefore the continuity of the session can be implemented; the inter-access and seamless handoff of the host among the different network area can be implemented effectively during the mobility, the multi-homing, the dynamic reallocation of IP addresses.

The other features and advantages of the present invention will be set forth in the description hereinafter, and will be partly apparent from the description, or be understood by implementing the present invention. The purpose and other advantages of the present invention can be implemented and obtained by the structures particularly pointed out in the description, claims, and drawings.

DETAILED DESCRIPTION

Figure 1:
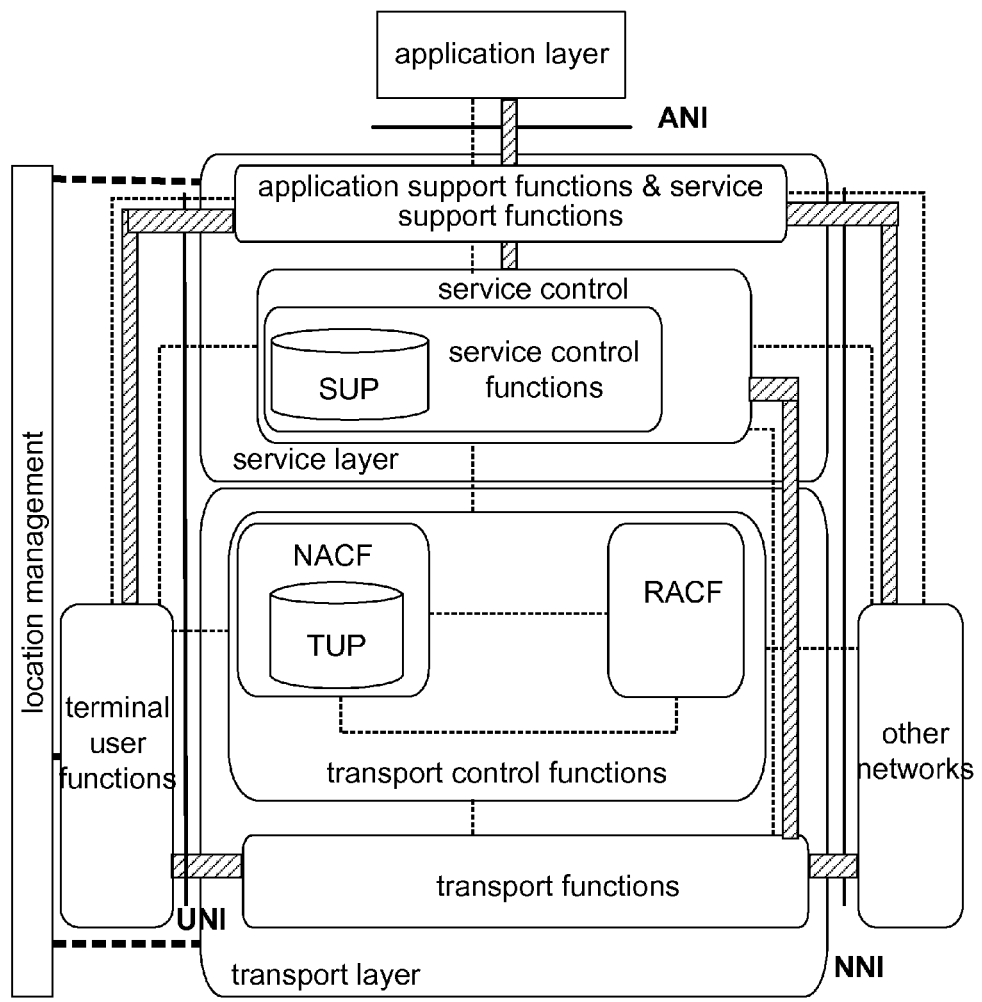
FIG. 1 is a system architecture diagram of an NGN in the pertinent prior art.

In order to support the mobility and multi-homing and better support the continuity of the session, it is required to use the technology of identity identifier and location separation in the NGN (Ipsplit or ID/locator separation in the NGN) so as to solve the problem of the semantic overload of the IP addresses. Separating the dual functions of IP addresses can support the mobility, the multi-homing, the dynamic reallocation of IP addresses and the inter-access among the different network area, etc.

In the Ipsplit technique, the Host Identifiers globally and uniquely identify each host which is connected to the Internet so as to separate the transport layer and the network layer, to provide the Internet with a method for safe host mobility and multi-master, and an encrypted name space of the host identifier, thus both communicating parties can be authenticated more easily and a safe and reliable network system can be implemented.

In a specific application, a certain host may have no less than one host identifier. For example, a host may have one public identifier code and one anonymous identifier code as a host identifier, wherein the additional identifier code may be declared by itself, and also can be obtained by a third party certification authority, the host identifier can be denoted by a Node ID. In the Ipsplit technique, the bearer network to be accessed can be selected according to the requirement of the user and the quality of the signals, thus ensuring the service quality of the user service and the continuity of the session.

A solution for implementing identity identifier and location separation is provided in the embodiments of the present invention based on the Ipsplit technique. In the embodiments of the present invention, two functional entities which are an Id-loc-split Control Functions entity and an Id-loc-split Mapping Functions entity are added in the NGN, wherein the Id-loc-split Mapping Functions entity is used to store a mapping relationship between the terminal address identifier (LOC) and the host identity identifier (Node ID), wherein each Node ID may correspond to multiple LOCs; and the Id-loc-split Control Functions entity is used to control a dynamical mapping between the Node ID and the LOC, and select the LOC corresponding to the Node ID. In the embodiments of the present invention, the network access control component sends a mapping request to the Id-loc-split Mapping Functions entity when receiving a location change request so as to request the LOC which is mapped to the Node ID of the terminal host, and the Id-loc-split Mapping Functions entity sends a location update request to the Id-loc-split Control Functions entity after receiving the mapping request; and the Id-loc-split Control Functions entity returns a mapping response to the Id-loc-split Mapping Functions entity after receiving the location update request, wherein the mapping response contains the location where the terminal host is currently located and the identity identifier, the Id-loc-split Mapping Functions entity updates the mapping relationship between the terminal host identity identifier and terminal host location according to the mapping response, and the Id-loc-split Control Functions entity selects the address corresponding to the location where the terminal host is currently located from the updated mapping relationship between the terminal host identity identifier and terminal host location, and returns the address to the network access control component.

In the case without conflict, the embodiments of the present invention and the features in the embodiments can be combined with each other.

Preferred embodiments will be described hereinafter in combination with the complying drawings, it should be understood that these preferred embodiments described here are intended to illustrate and explain the present invention and not to limit the present invention.

According to the embodiments of the present invention, a system for implementing identity identifier and location separation is first provided.

Figure 2:
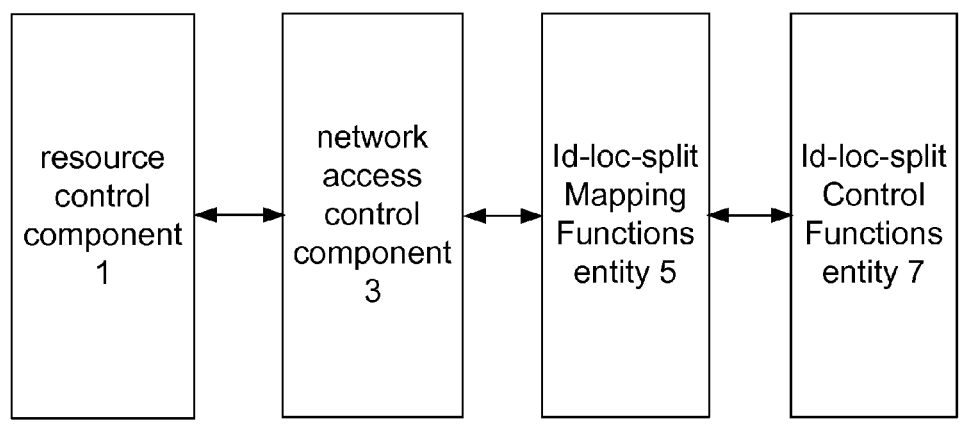
FIG. 2 is a structural diagram illustrating a system for implementing identity identifier and location separation according to an embodiment of the present invention.

FIG. 2 is a structural diagram illustrating a system for implementing identity identifier and location separation according to an embodiment of the present invention. The system primarily comprises a resource control component 1, a network access control component 3, an Id-loc-split Mapping Functions entity 5, and an Id-loc-split Control Functions entity 7, as shown in FIG. 2.

Wherein the resource control component 1 is used to send a location change request which contains a Node ID of a terminal host; the network access control component 3 is used to receive the location change request, and send a mapping request to the ID-loc-split Mapping Functions entity 5; the ID-loc-split Mapping Functions entity 5 is used to receive the mapping request, send a location update request to the ID-loc-split Control Functions entity 7, and update a mapping relationship between the terminal host identity identifier and the terminal host location according to a mapping response returned from the ID-loc-split Control Functions entity 7, wherein the mapping response contains the location where the terminal host is currently located and the identity identifier; and the ID-loc-split Control Functions entity 7 is used to receive the location update request, return the mapping response message, and select the address corresponding to the location where the terminal host is currently located from the updated mapping relationship between the terminal host identity identifier and the terminal host location.

Figure 3:
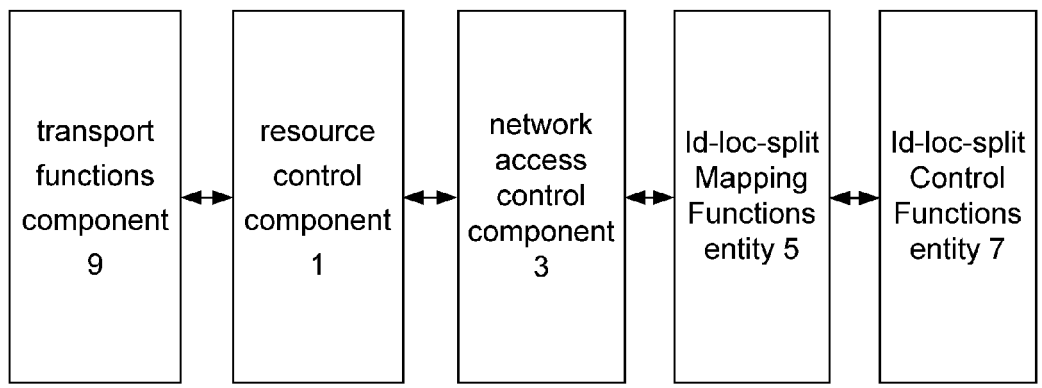
FIG. 3 is a structural diagram illustrating a system for implementing identity identifier and location separation according to a preferred embodiment of the present invention.

In particular, the system further comprises: a transport functions component 9, which is used to determine whether to implement location change, and interact, when determining to implement the location change, with the resource control component 1 to apply for the resource which is needed in the location change, as shown in FIG. 3. Then, the resource control component 1 sends the location change request.

In particular, the transport functions component 9 may determine whether to implement location change by itself, and may also determine whether to implement location change when receiving the notice information from the terminal, consequently, the transport functions component 9 may further be used to receive information containing the identity identifier, the information is sent by the terminal host when the route switch or address change occurs.

Further, the ID-loc-split Control Functions entity 7, after selecting the location identifier, also returns the selected address (LOC) to the network access control component 3 through the ID-loc-split Mapping Functions entity 5. The network access control component 3, after receiving the address, carries the address into the response message of the location change request and returns the response message to the resource control component 1, the resource control component 1, after receiving the response message, carries the address into the switch status notice and sends the switch status notice to the transport functions component 9, and the transport functions component 9 carries the address into the switch information notice and sends the switch information notice to the terminal host, then the terminal host transmits information using the address identifier.

Figure 4:
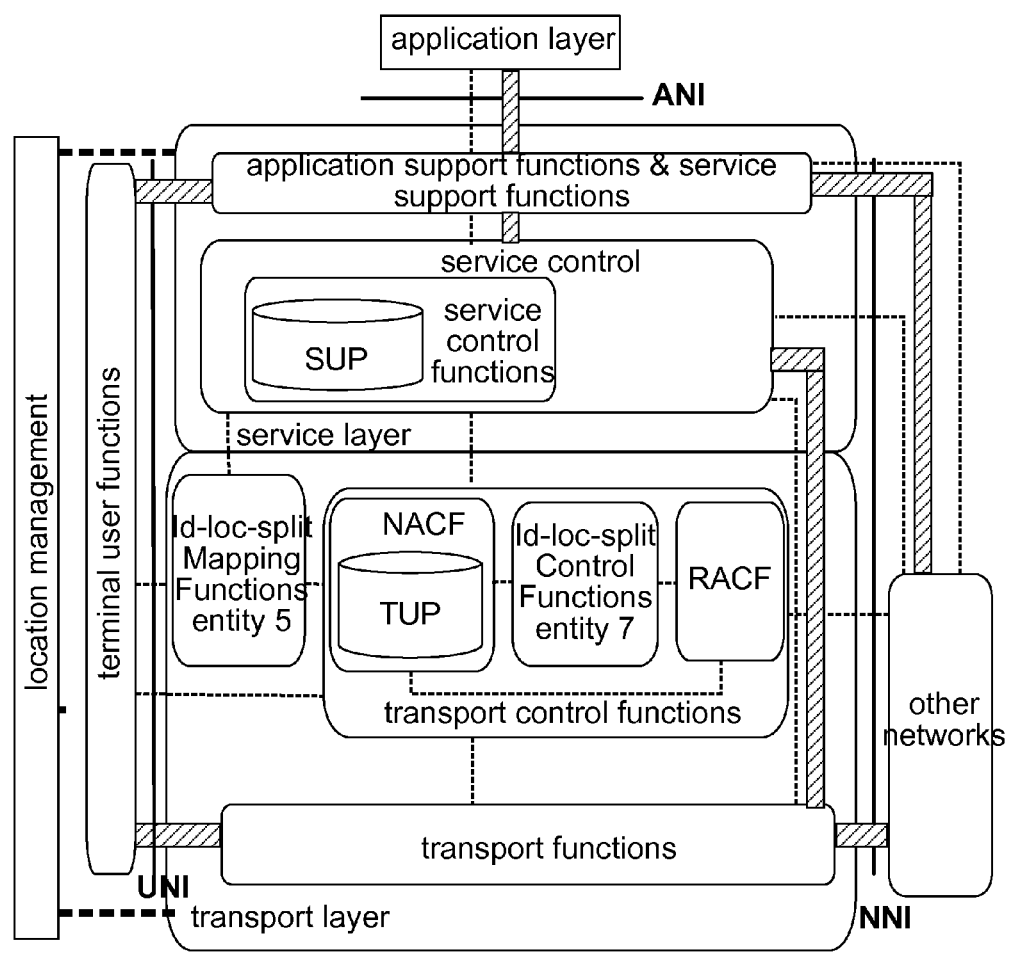
FIG. 4 is a structural diagram illustrating specific implementation of a system for implementing identity identifier and location separation according to an embodiment of the present invention.

During a specific application, the system for implementing identity identifier and location separation provided in the embodiment of the present invention may be implemented through the system shown in FIG. 4. As shown in FIG. 4, compared to the existing NGN, the ID-loc-split Mapping Functions entity 5 and the ID-loc-split Control Functions entity 7 are added in the NGN according to the embodiment of the present invention. In the traditional network, when starting one application service, the identifiers of the NGN (such as URL or SIP identifier) are transformed into IP addresses, which are not only used as identifiers in the application layer and transport layer in a session, but also used as addresses for distributing and routing of data packets. However, in the embodiments of the present invention, the ID-loc-split Mapping Functions entity 5 and the ID-loc-split Control Functions entity 7 are added in the NGN, wherein two mappings are implemented in the ID-loc-split Mapping Functions entity 5, one of which is to map the NGN identifiers into one or more Node IDs, and the other of which is to map the Node IDs into one or more LOCs dynamically.

Similarly to the traditional network, the terminal user uses NGN identifiers to start the end-to-end services, and transforms the NGN identifiers into Node IDs. The ID-loc-split Mapping Functions entity 5 maps the Node IDs into LOCs under the action of the ID-loc-split Control Functions entity 7, and then LOCs are used to implement data transmission. In the case of mobility or multi-homing, the identifier of the user keeps unchanged in the process of location change when the LOCs are changed by the user, and thus continuity of the end-to-end session is ensured.

In particular, when the terminal location LOC is changed because of mobility or multi-homing, the ID-loc-split Mapping Functions entity 5 firstly interacts with the TUP so as to find out the access network to be connected by inquiring the network, and triggers the processes of authentication and authority. In the processes described above, based on the security policy rule, the ID-loc-split Control Functions entity 7 selects the required LOC by means of identity management, authentication, authority, etc.

The system for implementing identity identifier and location separation described above according to the embodiment of the present invention can ensure separation of the identity identifier and location, thus ensuring the continuity of the end-to-end session.

A device for implementing identity identifier and location separation described above according to embodiments of the present invention is also provided, which can be used as the ID-loc-split Mapping Functions entity 5 and the ID-loc-split Control Functions entity 7 in the above system.

Figure 5:
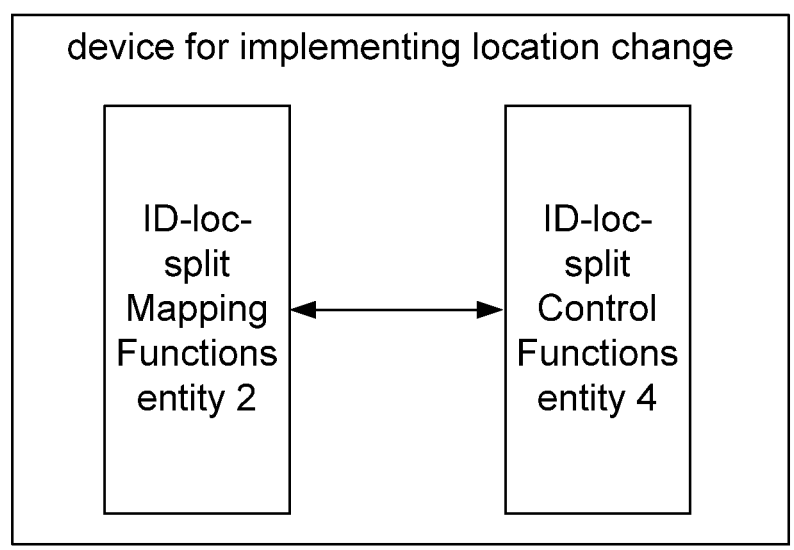
FIG. 5 is a structural diagram illustrating a device for implementing identity identifier and location separation according to an embodiment of the present invention.

FIG. 5 is a structural diagram illustrating a device for implementing identity identifier and location separation according to an embodiment of the present invention. As shown in FIG. 5, the device primarily comprises: an ID-loc-split Mapping Functions entity 2 and an ID-loc-split Control Functions entity 4. Wherein the ID-loc-split Mapping Functions entity 2 is used to store a mapping relationship between the terminal host identity identifier and the terminal host location, send a location update request to the ID-loc-split Mapping Functions entity 4 after receiving the mapping request sent from the network access control component, and update the mapping relationship between the terminal host identity identifier and the terminal host location according to a mapping response returned by the ID-loc-split Control Functions entity, wherein the mapping response contains the location where the terminal host is currently located and the identity identifier; and the ID-loc-split Control Functions entity 4 is used to receive the location update request, return the mapping response message, select the address (LOC) corresponding to the location where the terminal host is currently located from the mapping relationship between the terminal host identity identifier and the terminal host location, which is updated by the ID-loc-split Mapping Functions entity 2, and return the selected address to the network access control component through the ID-loc-split Mapping Functions entity 2.

Separation of the identity identifier and location can be implemented by the above device for implementing identity identifier and location separation according to the embodiment of the present invention.

A method for implementing identity identifier and location separation according to an embodiment of the present invention is also provided, which can be implemented by the system and device described above.

Figure 6:
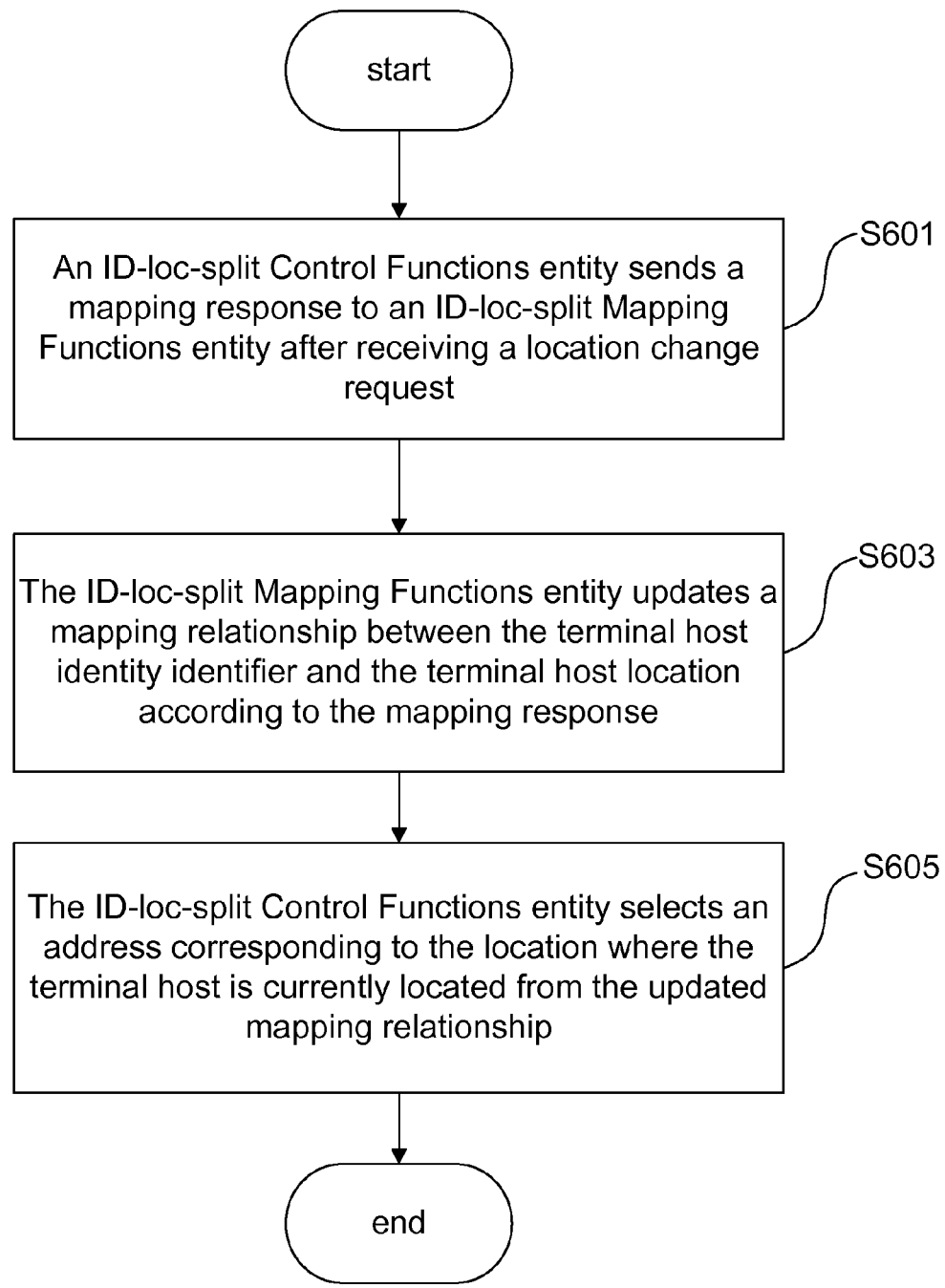
FIG. 6 is a flow chart illustrating a method for implementing identity identifier and location separation according to an embodiment of the present invention.

FIG. 6 is a flow chart illustrating a method for implementing identity identifier and location separation according to an embodiment of the present invention. As shown in FIG. 6, the method comprises the following steps (steps S601-S605):

step S601: an ID-loc-split Control Functions entity sends a mapping response to an ID-loc-split Mapping Functions entity after receiving a location change request, wherein the mapping response contains the location where the terminal host is currently located and the identity identifier;

step S603: the ID-loc-split Mapping Functions entity updates a mapping relationship between the terminal host identity identifier and the terminal host location according to the mapping response;

step S605: the ID-loc-split Control Functions entity selects an address corresponding to the location where the terminal host is currently located from the updated mapping relationship between the terminal host identity identifier and the terminal host location.

The above processes will be described below.

1. Step S601

In the process of the specific implementation, the processing of the step S601 can be triggered by the following steps:

step 1: a transport functions component determines to implement location change, and interacts with a resource control component to apply for the resource which is needed in the location change;

step 2: the resource control component completes a process of resource reservation, and sends a location change request to a network access control component;

step 3: the network access control component receives the location change request;

step 4: the network access control component sends a mapping request to the ID-loc-split Mapping Functions entity after receiving the location change request;

step 5: the ID-loc-split Mapping Functions entity receives the mapping request, and sends the location change request to the ID-loc-split Control Functions entity.

In a specific application, the transport functions component may determine whether to implement location change according to its interior policy, and interact, when determining to implement the location change, with the resource control component to apply for the resource which is needed in the location change in the above step 1; alternatively, the transport functions component may also determine whether to implement location change when receiving the information sent by the UE, in particular, when route switch or location change occurs because of moving or multi-homing, the UE interacts with the transport functions component, and then the transport functions component selects available LOC according to the host identity identifier.

2. Step S603

The ID-loc-split Mapping Functions entity, after receiving the mapping response sent by the ID-loc-split Control Functions entity, updates the mapping relationship between the terminal host identity identifier and the terminal host location according to the is location where the terminal host is currently located and the identity identifier which are contained in the mapping response.

In a specific implementation, the mapping relationship between the terminal host identity identifier and the terminal host location, which is stored in the ID-loc-split Mapping Functions entity, can be established when the terminal host implements registration using the host identity identifier, in particular, the ID-loc-split Mapping Functions entity interacts with the TUP and SUP of the resource access control component so as to implement registration, access and authentication for the terminal host, and then establishes the mapping relationship between the terminal host identity identifier and the terminal host location.

3. Step S605

After the ID-loc-split Mapping Functions entity updates the mapping relationship between the terminal host identity identifier and the terminal host location, the ID-loc-split Control Functions entity interacts with the ID-loc-split Mapping Functions entity, selects the address (LOC) corresponding to the location where the terminal host is currently located from the updated mapping relationship between the terminal host identity identifier and the terminal host location, and returns the selected LOC to the network access control component, the network access control component sends the response message of the location change request to the resource control component after receiving the LOC, wherein the selected LOC is contained in the response message, the resource control component, after receiving the response message, releases the resource allocated for the location change, and sends the switch status notice to the transport functions component, wherein the selected LOC is contained in the switch status notice; and the transport functions component sends the switch information notice containing the LOC to the terminal, and then the terminal transmits information using the LOC.

According to the method for implementing identity identifier and location separation described above in the embodiment of the present invention, only the location identifier is changed with the identity identifier unchanged during the location change.

In order to further understand the method for implementing identity identifier and location separation described above according to embodiments of the present invention, the specific implementation process of the above method for implementing identity identifier and location separation provided in the embodiment of the present invention will be illustrated in combination with the FIG. 4.

Figure 7:
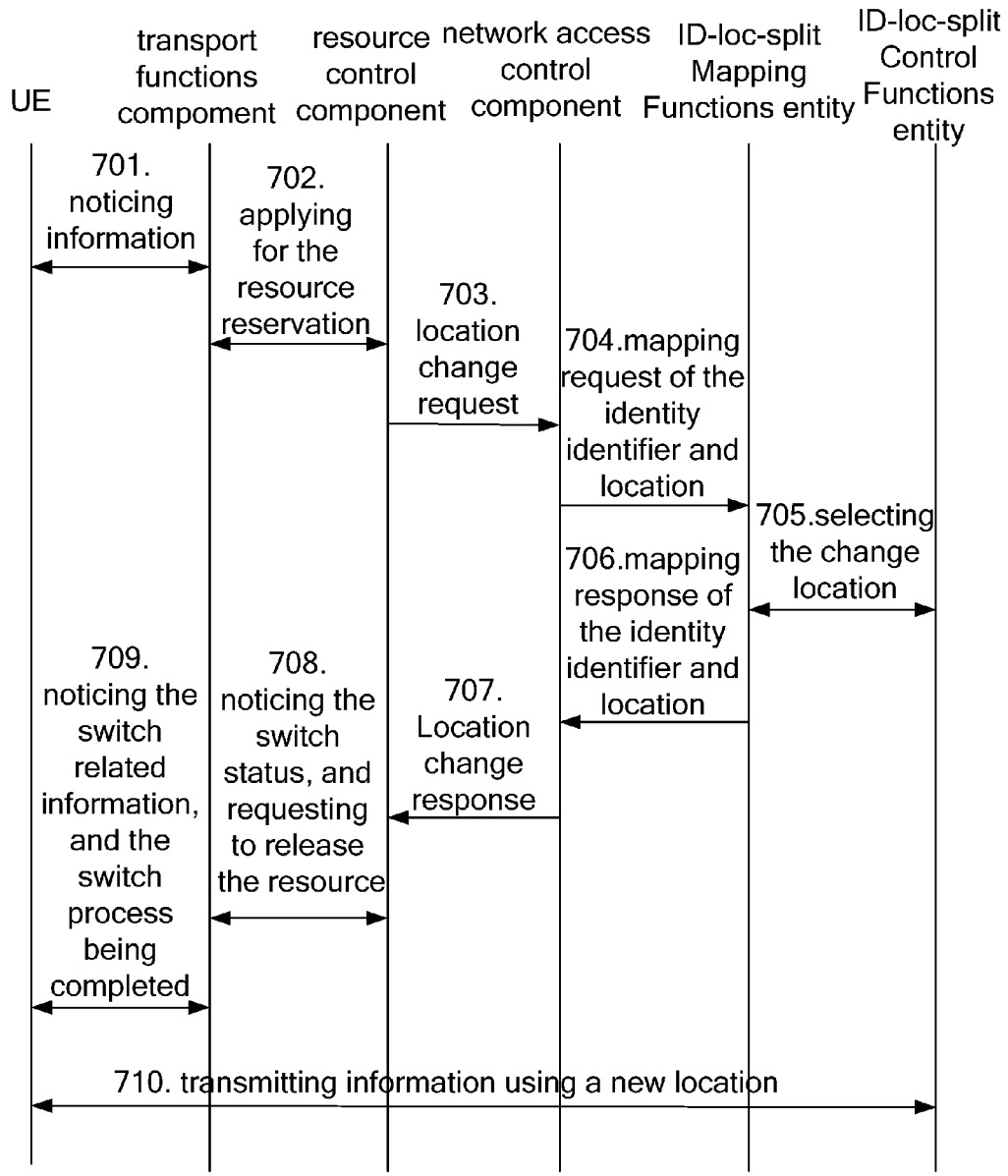
FIG. 7 is a flow chart illustrating a method for implementing identity identifier and location separation according to a preferred embodiment of the present invention.

FIG. 7 is a flow chart illustrating a method for implementing identity identifier and location separation in an NGN system. As shown in FIG. 7, the method primarily comprises:

step S701: when the location change or location switch of the UE occurs due to moving or multi-homing, the UE finds out a better transport functions component than the existing links by performing detection, and interacts with transport functions component (or transport component) to notice the related information according to the network policy rule;

preferably, the step S701 will not be implemented in the case that the UE changes the location passively;

step S702: the transport functions component determines whether to start to change the location LOC according to the network policy rule after receiving the information sent by the UE, and interacts with the resource control component if the location change is implemented, so as to apply for the resource which is needed in the location change, or else, the process ends;

step S703: the resource control component completes the process of resource reservation, applies the policy decision results to the transport functions component, and sends the location change request to the network access control component;

in particular, in the step S703, the resource control component interacts with the network access control component so as to complete the authentication and authority, etc;

step S704: the resource control component sends a mapping request of the identity identifier and location to the ID-loc-split Mapping Functions entity, wherein the mapping request contains the identity identifier of the terminal host;

step S705: the ID-loc-split Mapping Functions entity receives the mapping request, sends the location update request to the ID-loc-split Control Functions entity, the ID-loc-split Control Functions entity returns the mapping response after receiving the location update request, wherein the mapping response contains the location where the terminal host is currently located and the identity identifier, the ID-loc-split Mapping Functions entity, after receiving the mapping response, updates the mapping relationship between the terminal host identity identifier and the terminal host location according to the parameters contained in the mapping response; and the ID-loc-split Control Functions entity selects the LOC corresponding to the location where the terminal host is currently located from the updated mapping relationship between the terminal host identity identifier and the terminal host location, and sends the selected LOC to the ID-loc-split Mapping Functions entity;

step S706: the ID-loc-split Mapping Functions entity interacts with the network access control component, sends the mapping response of the identity identifier and location to the network access control component and sends the selected LOC to the network access control component;

step S707: the network access control component interacts with the resource control component, and sends the location change response to the resource control component, wherein the selected LOC is contained in the location change response;

step S708: the resource control component interacts with the transport functions component so as to transmit the switch related information containing the LOC and releases the resource allocated for the location change;

step S709: the transport functions component interacting with the UE so as to transmit the switch related information and the switch process is completed;

step S710: the change process is completed, the UE can perform communication using the LOC corresponding to the location.

As described above, by virtue of the technical solution provided in the embodiments of the present invention, separation of the identity identifier and location in the NGN can be implemented by dynamically mapping the identity identifier and the location, which overcomes the drawbacks of the existing identity identifier and location separation technique. When the terminal in the NGN moves within the same access network or among different access networks, the connection of the transport layer will not be interrupted because the host identifier (Node ID) keeps unchanged, thus ensuring the continuity of the session.

The above descriptions are only preferred embodiments of the present invention, and are not intended to limit the present invention. For those skilled in the art, the present invention can have various modifications and changes. Any modifications, equivalent alternatives, and improvements made within the spirit and principle of the present invention should be within the protection scope of the present invention.

What is claimed is:

1. A method for implementing identity identifier and location separation, comprising:
an ID-loc-split Control Functions entity sending a mapping response to an ID-loc-split Mapping Functions entity after receiving a location change request, wherein the mapping response contains a location where a terminal host is currently located and an identity identifier;
the ID-loc-split Mapping Functions entity updating a mapping relationship between the terminal host identity identifier and the terminal host location according to the mapping response; and
the ID-loc-split Control Functions entity selecting an address corresponding to the location where the terminal host is currently located from the updated mapping relationship between the terminal host identity identifier and the terminal host location,
wherein after selecting the address, the method further comprises:
the ID-loc-split Control Functions entity returning the selected address to a network access control component;
the network access control component sending a response message of the location change request to a resource control component, wherein the response message contains the selected address;
the resource control component receiving the response message, releasing the resource allocated for the location change, and sending a switch status notice to a transport functions component, wherein the switch status notice contains the selected address; and
the transport functions component sending switch information notice to a terminal, and the terminal transmitting information using the address,
wherein each of the ID-loc-split Control Functions entity, the ID-loc-split Mapping Functions entity, the network access control component, the resource control component, and the transport functions component comprising a computer processor and respective memory, the respective memory storing computer-readable instructions which when executed by the computer processor implement the functions of the said components.

2. The method according to claim 1, before receiving the location change request, the method further comprising:
a transport functions component determining to implement location change, and interacting with a resource control component to apply for resource which is needed in the location change;
the resource control component completing a process of resource reservation, and sending a location change request to a network access control component;
the network access control component receiving the location change request, and sending a mapping request to the ID-loc-split Mapping Functions entity; and
the ID-loc-split Mapping Functions entity receiving the mapping request, and sending the location change request to the ID-loc-split Control Functions entity.

3. The method according to claim 2, before the transport functions component determines to implement the location change, the method further comprising:
sending information comprising the identity identifier to the transport functions component when route switch or address change of the terminal host occurs.

4. The method according to claim 3, before the route switch or address change of the terminal host occurs, the method further comprising:
the ID-loc-split Mapping Functions entity interacting with a TUP and SUP of the resource access control component so as to implement registration, access, and authentication for the identity identifier, and then establishing the mapping relationship between the terminal host identity identifier and the terminal host location.

5. A system for implementing identity identifier and location separation, comprising:
 a resource control component, arrange to send a location change request;
 a network access control component, arrange to receive the location change request, and send a mapping request to an ID-loc-split Mapping Functions entity;
 the ID-loc-split Mapping Functions entity, arrange to receive the mapping request, send a location update request to an ID-loc-split Control Functions entity, and update a mapping relationship between a terminal host identity identifier and a terminal host location according to a mapping response returned from the ID-loc-split Control Functions entity, wherein the mapping response contains the location where a terminal host is currently located and the identity identifier; and
 the ID-loc-split Control Functions entity, arrange to receive the location update request, return the mapping response message, and select an address corresponding to the location where the terminal host is currently located from the updated mapping relationship between the terminal host identity identifier and the terminal host location,
 wherein the system further comprises:
 a transport functions component, arrange to determine to implement a location change, and interact with the resource control component to apply for resource which is needed in the location change;
 wherein the ID-loc-split control functions entity is further arrange to return the selected address to the network access control component via the ID-loc-split mapping functions entity;
 the network access control component is further arrange to send a response message of the location change request to the resource control component, wherein the response message contains the selected address;
 the resource control component is further arrange to receive the response message, and send a switch status notice to the transport functions component, wherein the change status notice contains the selected address; and
 the transport functions component is further arrange to send a switch information notice to the terminal, wherein the switch information notice contains the selected location identifier, so as to make the terminal transmit information using the address identifier,
 wherein each of the ID-loc-split Control Functions entity, the ID-loc-split Mapping Functions entity, the network access control component, the resource control component, and the transport functions component comprising a computer processor and respective memory, the respective memory storing computer-readable instructions which when executed by the computer processor implement the functions of the said components.

6. The system according to claim 5, wherein the transport functions component is further arrange to receive information containing the identity identifier, the information is sent by the terminal host when route switch or address change of the terminal host occurs.

7. A device for implementing identity identifier and location separation, comprising:
 an ID-loc-split Mapping Functions entity, arrange to store a mapping relationship between a terminal host identity identifier and a terminal host location, send a location update request to an ID-loc-split Control Functions entity after receiving a mapping request sent from a network access control component, and update the mapping relationship between the terminal host identity identifier and the terminal host location according to a mapping response sent from the ID-loc-split Control Functions entity, wherein the mapping response contains the location where the terminal host is currently located and the identity identifier; and
 the ID-loc-split Control Functions entity, arrange to receive the location update request, return the mapping response message, select an address corresponding to the location where the terminal host is currently located from the updated mapping relationship between the terminal host identity identifier and the terminal host location, and return the selected address to the network access control component via the ID-loc-split Mapping Functions entity,
 wherein after receiving the selected address, the network access control component sending a response of the location change request to a resource control component, wherein the response message contains the selected address;
 the resource control component receiving the response message, releasing the resource allocated for the location change, and sending a switch status notice to a transport functions component, wherein the switch status notice contains the selected address; and
 the transport functions component sending switch information notice to a terminal, and the terminal transmitting information using the address,
 wherein each of the ID-loc-split Control Functions entity, the ID-loc-split Mapping Functions entity, the network access control component, the resource control component, and the transport functions component comprising a computer processor and respective memory, the respective memory storing computer-readable instructions which when executed by the computer processor implement the functions of the said components.

* * * * *